United States Patent [19]
Grant

[11] Patent Number: 5,477,931
[45] Date of Patent: Dec. 26, 1995

[54] V DITCHING MACHINE

[76] Inventor: George E. Grant, 11739 NE. 128th Ave., Okeechobee, Fla. 34972

[21] Appl. No.: 163,684

[22] Filed: Dec. 6, 1993

[51] Int. Cl.⁶ ................................................. A01B 13/02
[52] U.S. Cl. ............................ 172/701; 37/908; 172/568; 172/584; 172/585; 172/591; 172/600
[58] Field of Search .................... 172/701, 568, 172/579, 581–585, 591, 599, 600, 527, 628, 630, 642, 631, 632, 652, 653; 111/164, 165; 37/372, 366, 378, 908

[56] References Cited

U.S. PATENT DOCUMENTS

| | | | |
|---|---|---|---|
| 852,777 | 5/1907 | Dudley | 111/164 |
| 1,631,639 | 6/1927 | McDonald | 37/366 |
| 1,632,303 | 6/1927 | Lindeman . | |
| 1,881,549 | 10/1932 | Hubbard | 172/591 |
| 2,044,304 | 6/1936 | James | 172/184 |
| 2,385,637 | 9/1945 | Mitchell et al. | 172/583 |
| 2,455,566 | 12/1948 | Deakins | 172/184 |
| 2,621,459 | 12/1952 | Scott | 172/568 |
| 2,725,649 | 12/1955 | Santos . | |
| 2,749,694 | 6/1956 | Klemm et al. | 172/591 |
| 2,762,182 | 9/1956 | Gardner | 172/591 |
| 2,798,419 | 7/1957 | Moriceau | 172/584 |
| 2,938,588 | 5/1960 | Stein | 172/584 |
| 4,243,104 | 1/1981 | Sipos et al. | 172/652 |

FOREIGN PATENT DOCUMENTS

| | | | |
|---|---|---|---|
| 392897 | 11/1973 | U.S.S.R. | 111/164 |
| 803878 | 2/1981 | U.S.S.R. | 172/701 |

Primary Examiner—Randolph A. Reese
Assistant Examiner—Spencer Warnick

[57] ABSTRACT

This is a machine for forming V-ditches for the irrigation of soil. The machine consists of a central frame with a two wheel carriage and plows of subassemblies. Each plow consists of a right subassembly and a left subassembly universally connected to the right and left sides respectively of the central frame. Each plow forms an acute horizontal angle with the central frame. The acute angle is fixed by the use of chains, having one part adjacent to an end attached to the central frame and another part of the chain adjacent to the opposite end, attached to the extended end of the subassembly. Each subassembly contains concavo-convex rotatable discs mounted parallel to each other on a common axle. The discs are assembled so that the concave side of the discs penetrate the soil when the machine is moved forward by a suitable draft device.

6 Claims, 4 Drawing Sheets

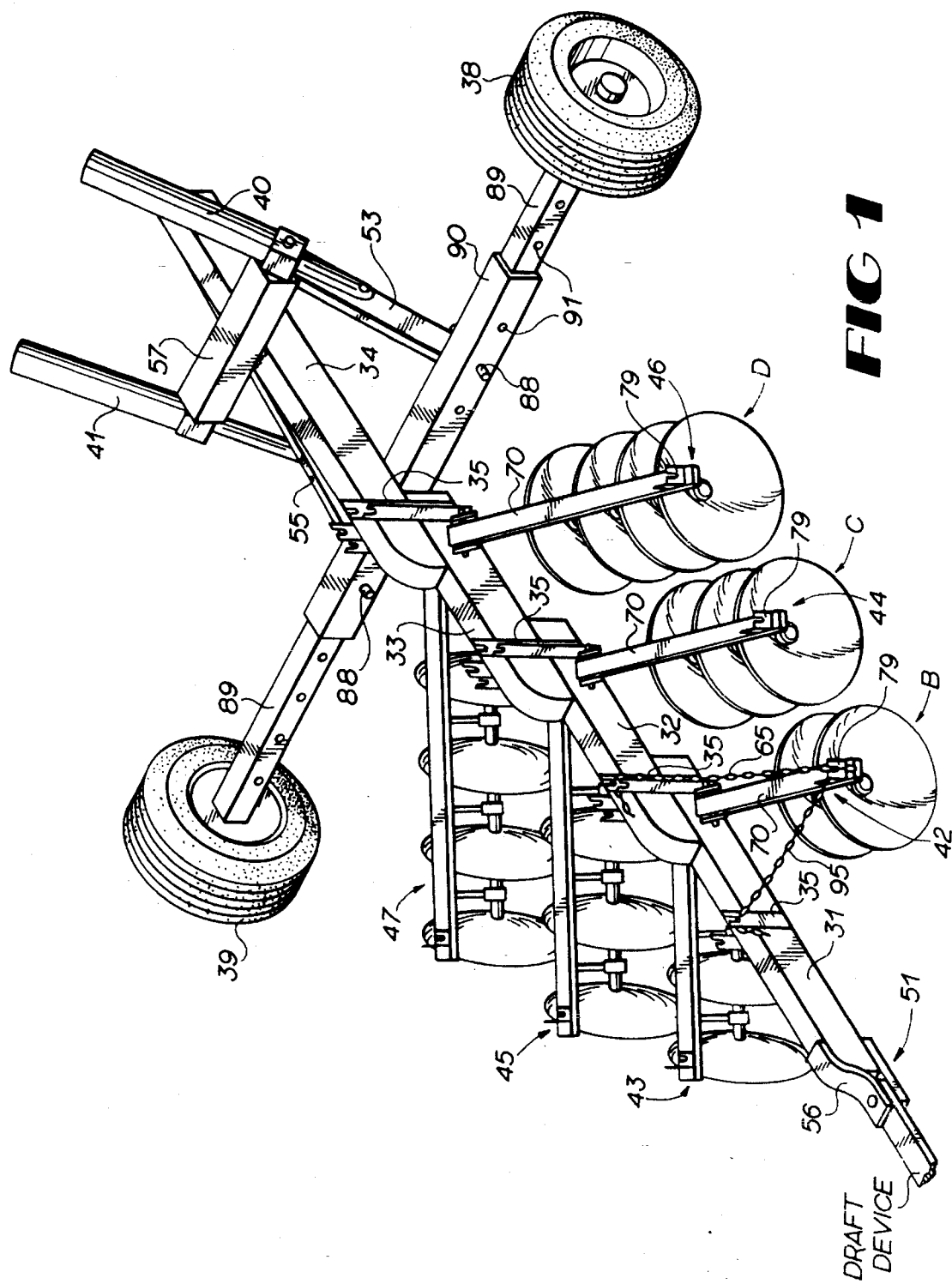

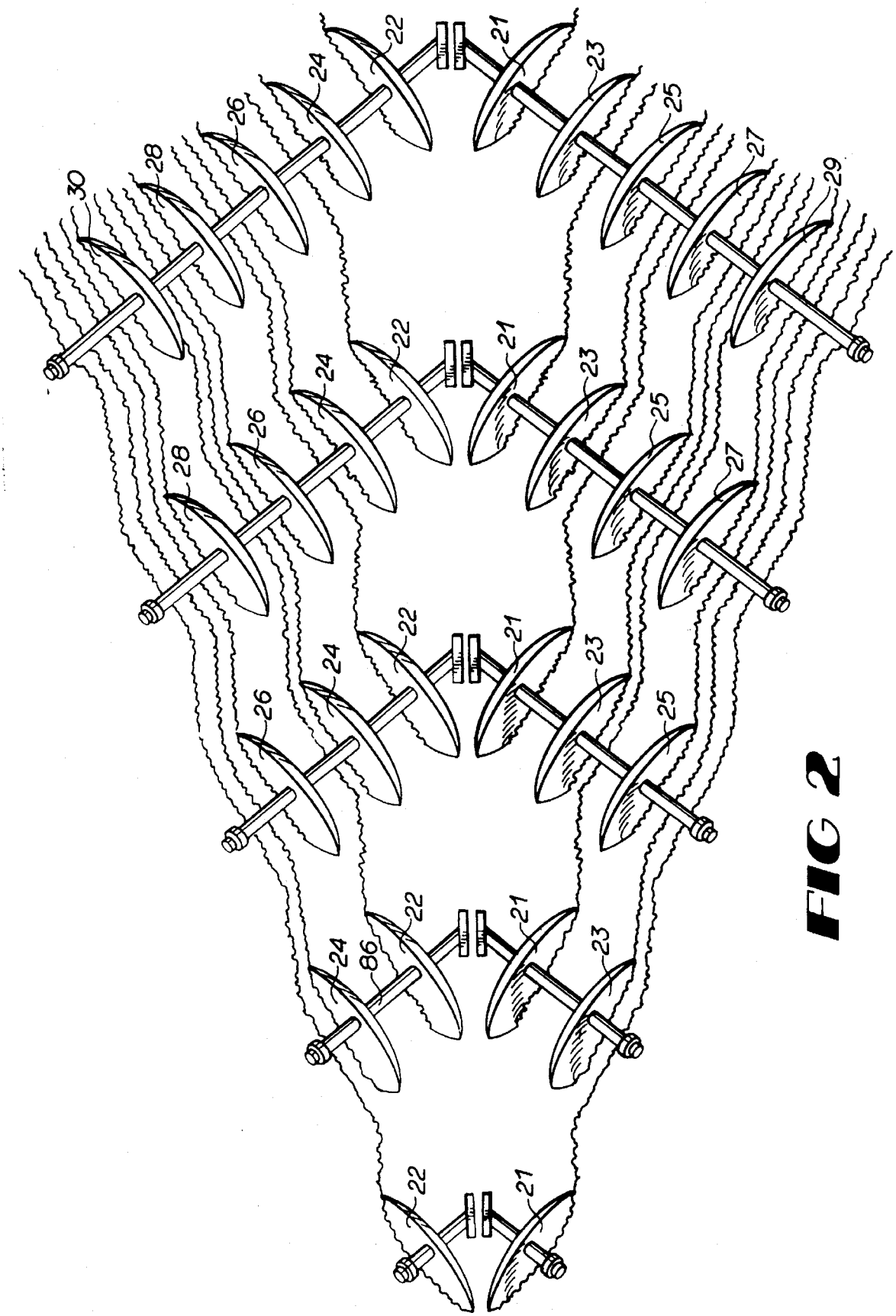

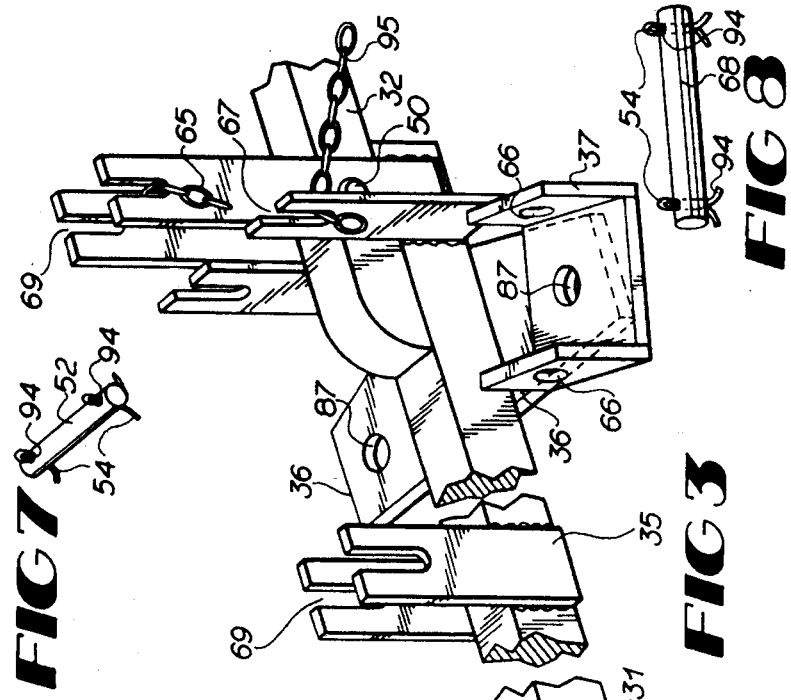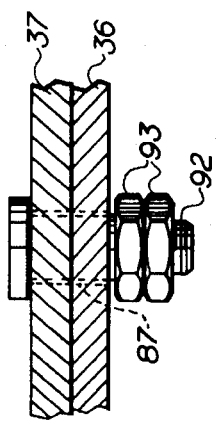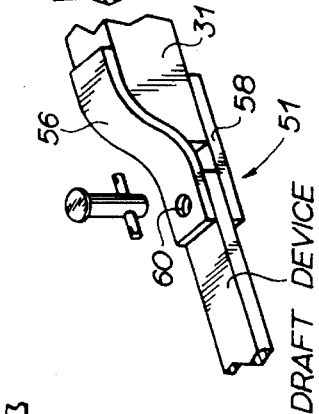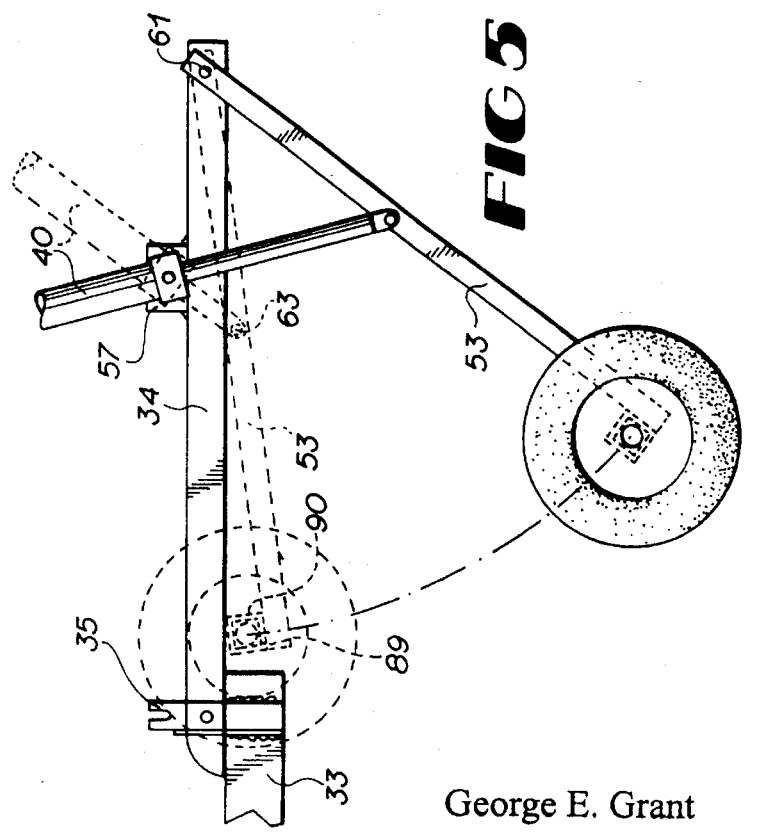

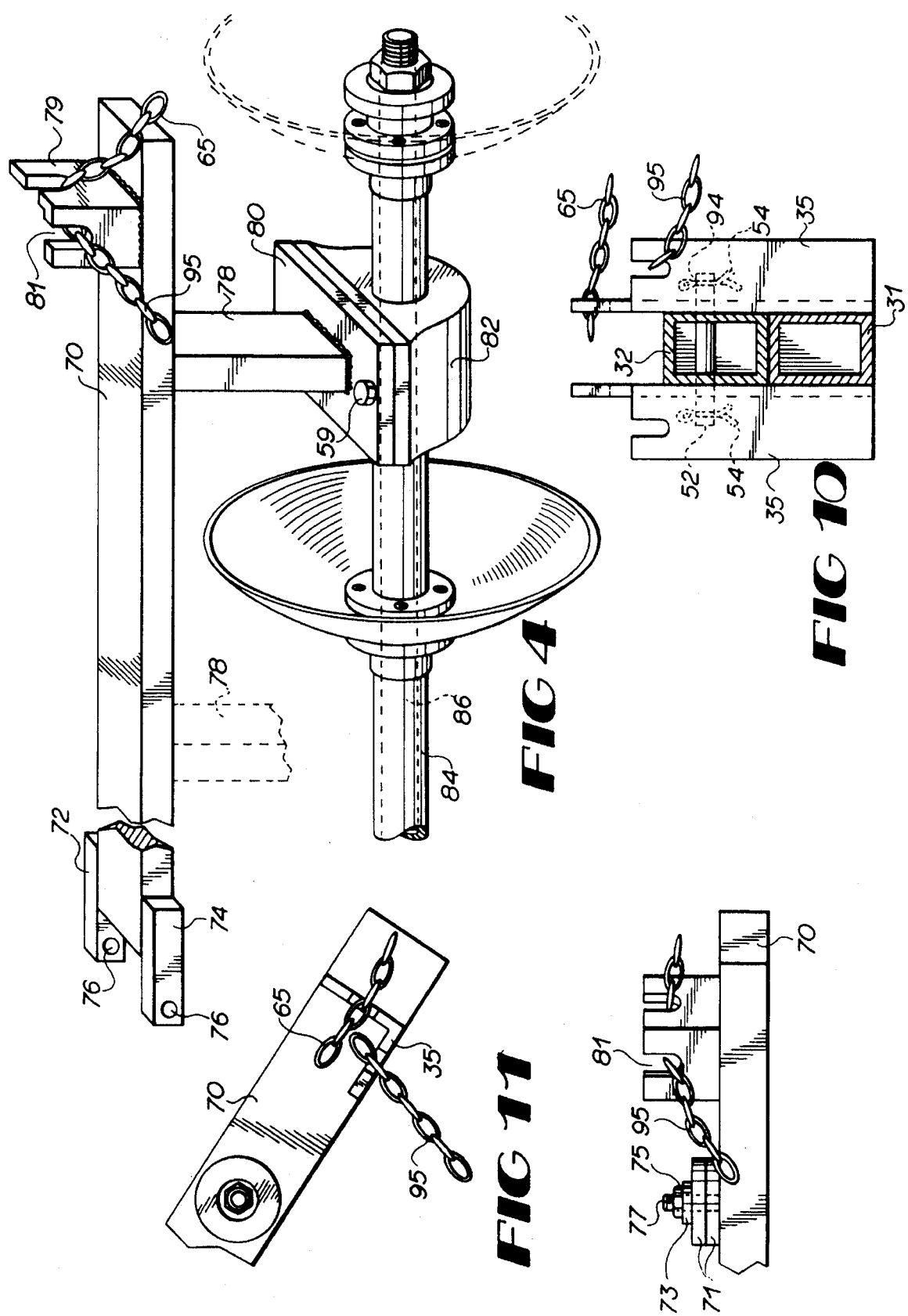

5,477,931

V DITCHING MACHINE

BACKGROUND

1. Field of Invention

This invention relates to equipment for landscaping areas in preparation for irrigation. This is applicable to orange groves. The ground area between rows of trees is landscaped to provide an irrigation ditch in the center, parallel to the rows of trees. The sides of the ditch slope upwardly toward the parallel line of trees, thus forming a V ditch.

2. Discussion of Prior Art

The irrigation of land through the use of ditches is an old art. The methods of forming the ditches have been developing over a long period. U.S. Pat. No. 1,632,303 to Lindeman (1927) shows concavo-convex discs used for penetrating and moving soil. The discs move the soil a little to the right and a little to the left of the line of movement of the device from which they are disposed. The movement of soil is limited to a narrow trench. U.S. Pat. No. 2,725,649 to Santos (1955) illustrates a disk gang-plow type ditching machine. The disk gang-plow will move soil laterally from its direction of movement, but it is limited to the use of only one plow on each side of the ditch.

Some entrepreneurs are presently using several pieces of standard commercial equipment. The equipment used, includes bulldozers, scrapers, graders, front end loaders and others. This haphazard method of using several pieces of equipment, has required the entrepreneur to keep several pieces of equipment and their operators available, which prolonged the task and increased the cost of forming adequate irrigation ditches.

OBJECTS AND ADVANTAGES

Accordingly several objects and advantages of this invention are:

(a) to provide equipment that can form the predetermined depth and width of a V-ditch, without the use of supplementary pieces of soil moving equipment traversing the area and tracking the land.

(b) to provide equipment for forming V ditches, without the usual need for additional manpower for operating several types of soil moving equipment.

(c) to provide equipment for forming V ditches, of predetermined depth and width, that is not complicated and is easily assembled to produce the desired results.

(d) to provide equipment for forming V ditches that may easily be transported from an area such as a stored location to the area in which the V ditches are to be formed.

(e) to provide equipment for forming V ditches whereby the soil may be simultaneously moved equally to the right and to the left of the central movement of the equipment.

(f) to provide equipment for forming V ditches during one pass, over the terrain, thereby saving time and labor, and eliminating the need for extra equipment and manpower for accomplishing the desired results.

(g) to provide equipment for forming V ditches by assembling subassemblies of plows of concavo-convex discs whereby each trailing subassembly contains one or more discs, more than the preceding subassembly.

(h) to provide means for forming V ditches whereby weighted plows of concavo-convex discs being moved by force, in a planned line of direction, move the soil laterally right and left from the center of the line of movement. Weighted plows with additional discs, following the preceding plow will dig the center of the ditch deeper and move the soil laterally farther to the right and to the left than was done by the preceding plow.

Further objects and advantages are to provide a V ditching machine composed mostly of standard commercial parts. Still further objects and advantages will become apparent from a consideration of the ensuing description and drawings.

DRAWING FIGURES

FIG. 1 is a perspective view of this invention showing the two wheel carriage; the central frame consisting of four stepped, interlocking beams; and the subassemblies of plows.

FIG. 2 is a sketch from an overhead view showing the schematic arrangement of five tandem plows and the resulting movement and accumulation of soil farther and farther from the central line of movement of the machine.

FIG. 3 is a perspective view of the leading beam of the central frame, with details for connecting it to a second beam and to the subassemblies.

FIG. 4 is a perspective detail of parts composing a subassembly.

FIG. 5 is a view showing a two wheel carriage and the hydraulic cylinder and piston used to raise or lower the carriage.

FIG. 6 symbolizes the discs securely held between flanges. It also illustrates the end disc held in place by a flanged sleeve and nut.

FIG. 7 is a perspective view of a pin.

FIG. 8 is a perspective view of a pin.

FIG. 9 is a detail view of a swivel connection.

FIG. 10 is a sectional view taken at line x—x of FIG. 3.

FIG. 11 is a front and top view of a portion of beam 70 showing weights 71 being held onto stud 77 by collar 73 and nut 75. Also shown is slotted angle 79 welded to beam 70, to which are fastened chains 65 and 95 by means of slots 81.

DESCRIPTION FIGS. 1 THROUGH 11

A typical embodiment of this V ditching machine is illustrated in FIGS. 1 through 11. In FIG. 1 the central frame consists of four beams 31, 32, 33 and 34. Beam 32 has its front portion resting on the top rear portion of beam 31. The rear portion of beam 32 fits underneath the front portion of beam 33. The rear portion of beam 33 fits underneath the front portion of beam 34. Beams 31, 32, 33 and 34 are joined together by slotted angles 35 and pins 52 (shown in FIGS. 3 and 7). Also attached to the central frame are the subassemblies 42, 43, 44, 45, 46 and 47 shown in detail in FIG. 4. Two similar but oppositely assembled, subassemblies attached adjacent to opposite sides of the central frame make-up a plow. Plows A, B, C, D and E are illustrated in FIG. 2. Plow B consists of subassemblies 42 and 43. Plow C consists of subassemblies 44, and 45. Plow D consists of subassemblies 46 and 47.

Beam 34(FIG. 1) has transversely attached to it beam 57, to which are attached hydraulic cylinders 40 and 41. Also pivotally attached to beam 34 are beams 53(FIG. 5) and 55(FIG. 1) which have their opposite ends welded to enveloping box beams 90. Cylinders 40 and 41 are pivotally attached to beams 53 and 55 respectively, by connectors 63. Beam 90 envelopes with box beams 89 to which are rotatably attached, wheels 38 and 39. Beams 89 and 90 have equally spaced matching holes 91 for the insertion of studs 88. By this means, the distance between wheels 38 and 39 may be adjusted for whatever length is required.

FIG. 5 shows hydraulic cylinder 40 pivotally attached to beam 57. The piston end of cylinder 40 is pivotally attached to beam 53 by connector 63. Beam 53 has one end pivotally attached to beam 34, by pin 61, and the other end welded to beam 90. This arrangement is duplicated but not shown on the other side of beam 34 by cylinder 41 being pivotally attached to beam 57. The piston end of cylinder 41 is pivotally attached to beam 55. Beam 55 has one end pivotally attached to beam 34 and the other end welded to beam 90.

In assembly, the central frame beams 31, 32, 33 and 34 are similarly joined together as symbolically shown in FIG. 3. The front end of beam 32 rests on top of the rear portion of beam 31 and between slotted angles 35. Pin 52(FIG. 7) is inserted through hole 50 and held in place by cotter pins 54 through holes 94. All central frame beams 31, 32, 33 and 34 are similarly joined.

When desirable, additional beams similar to beams 32 or 33 may be added to the assembly or beam 32 or 33 may be deleted from the assembly.

Central frame beams 31, 32 and 33 have welded to the bottom of each, in similar locations, a bracket 36 shown protruding from under each side of beam 31, having holes 87 through which stud bolts 92 (FIG. 9) may be used to attach swivels 37 to bracket 36. The swivels 37 are U-shaped and have a horizontal portion and two vertical side portions with matching holes 66 through the vertical side portions. Swivels 37 may be made of plates, forgings or plates welded together as shown in FIG. 3 or of other suitable materials. Swivels 37 have matching holes 66 through which pins 68 (FIG. 8) may be inserted for attaching subassemblies as shown in FIG. 4. Bracket 36 shown welded to the bottom of beam 31 is typical for beams similar to beams 31, 32 and 33. Subassemblies 42, 43, 44, 45, 46 and 47 are joined to beams 31, 32, and 33 respectively by placing parallel extensions 72 and 74, (FIG. 4) inside swivels 37. By aligning holes 66 with holes 76, pins 68 (FIG. 8) can be inserted through the aligned holes and held in place by cotter pins 54 through holes 94. Subassemblies 42, 43, 44, 45, 46 and 47 pivot vertically on pins 68.

Swivels 37 are attached to brackets 36 by aligning holes 87 in both pieces and fastening the two pieces together by the use of stud bolts 92 and locknuts 93. Subassemblies 42, 43, 44, 45, 46 and 47 horizontally swivel around bolt 92.

The front portion of beam 31(FIG. 1) shows a portion of the beam burned away so that a shaped plate 56 and a flat plate 58 with matching holes 60 in vertical alignment may be welded to the top and to the bottom respectively of beam 31, forming a typical towing hitch 51. A draft device (not drawn, but indicated), of predetermined capability is connected to the V ditching machine by means of towing hitch 51.

Beam 70 has chains 65 and 95 attached to the top surface by means of slots 81 in angles 79 (FIG. 4) at a predetermined distance from the central frame. Chain 95 extends forward and toward the central frame to which it is attached by means of slot 67 in angle 35, with the following exception: the forward end of beam 31 has an altered angle 35. One leg has been removed leaving one leg with slot 69 to which the forward chain 95 is attached. On the opposite side of beam 31, forward chain 95 is similarly attached to altered angle 35. The purpose of chain 95 is to hold beam 70 in a fixed predetermined angle relative to the central frame. Chain 65 extends upward and toward the central frame to which it is attached by means of slot 69 in slotted angle 35. The purpose of chain 65 is to limit the downward pivoting of beam 70 on pin 68(FIGS. 3 and 8) to a predetermined degree. This is most applicable when the V ditching machine is raised, usually in preparation for being moved to or from its area of operation. Chains 65 and 95 that are connected to the same angle 79 are not connected to the same angle 35. From a common angle 79, chain 95 is connected to an angle forward of the angle 35 to which chain 65, from a common angle 79 is connected.

It is to be understood that the chains 65 and 95 on each side of the central frame are similarly attached. Chains 65 and 95 on the right side of the central frame are attached to beams 70 and slotted angles 35 on the right side of the central frame. Chains 65 and 95 on the left side of the central frame are attached to beams 70 and slotted angles 35 on the left side of the central frame.

FIG. 4 shows the details of subassemblies shown in FIG. 1, which are symbolic of subassemblies 42, 43, 44. 45, 46 and 47. Each subassembly includes a beam 70 with extensions 72 and 74 welded or joined by other methods to beam 70. Extensions 72 and 74 have aligned holes 76. One or more pylons 78 are welded to the under-surface of beam 70. The lower end of pylons 78 are welded to plates 80, to which are attached, by bolts 59, bearings 82. Bearings 82 permit discs 21–30 (FIG. 2) to freely rotate with axle 86 which is enclosed within the spacers 84. The mechanism for mounting discs and bearings on axles is well known in the art.

The assembly shown in FIG. 4 is an illustration of the assemblies possible for connection to the central frame. Beam 70 may vary in size and length. The number of pylons 78 welded to beam 70, with its attached bearing 82 may vary depending upon the size of the subassembly needed. The number of discs (21–30) on each axle may be one or more as shown in FIG. 2. The size of the discs may vary in diameter, thickness and curvature depending upon the job requirements and the discretion of the user. The method of attaching the subassemblies to the central frame may be changed to whatever design is practical for serving the intended purpose of attaching the subassemblies to the central frame. The methods of attaching the discs, sleeves, bearings and end pieces to the axle 86 may be changed to whatever design is practical for serving the intended purpose for which they were designed.

It is to be understood that the assemblies and members of this V ditching machine that fit onto the right side of the central frame are similar to those assemblies and members that fit onto the left side of the central frame, but are designed and so assembled to move soil in the opposite directions from the central frame.

FIG. 2 symbolically shows discs 21–30 mounted on axles 86 of various predetermined lengths, assembled into plows A, B, C, D and E.

OPERATION

An embodiment of the V ditching machine disclosed in this application is shown assembled in FIG. 1. It consists of: plows B, C and D universally attached to beams 31, 32, and 33 respectively; beam 57 transversly disposed to beam 34 and welded thereto; beams 53 and 55 pivotally attached at one end to beam 34; a carriage composed of wheels 38 and 39 and enveloping box beams 89 and 90 to which are attached by welding, beams 53 and 55; and hydraulic cylinders 40 and 41 pivotally mounted on beam 57 having their moveable piston-end pivotally attached to beams 53 and 55 respectively.

Each plow B, C and D has its angle, with reference to beams 31, 32 and 33 respectively, adjusted to produce optimum results of moving soil right and left of the line of travel of the V ditching machine, thus forming a V ditch with sides forming a smooth bed. The angles between plows B, C and D and beams 31, 32 and 33 respectively are maintained by adjusting chains 95 (FIGS. 3, 4, 10 and 11). Chains 95 are attached to beams 70 by placing proper links of chain 95 into slots 69 and 81 of angles 35 and 79 respectively.

Wheels 38 and 39 are spaced apart to provide the proper distance for the V ditching machine to straddle the area through which the V ditch is to be formed. Pins 88 are removed while box beams 89 are moved in or out of box beam 90. When the desired distance between wheels 38 and 39 is established, pins 88 are reinserted into matching holes 91 through beams 89 and 90. Weights 71 are placed on beams 70 to cause the plows B, C and D to penetrate the soil to the desired depth. Weights 71 are held in place on fixed studs 77, by collars 73 and nuts 75.

To move the V ditching machine to the area in which the V ditch is to be formed, a suitable draft device, not drawn, but indicated, is attached to towing hitch 51. It is so attached that the point of attachment 51 will be at a constant distance from the ground level when the V ditching machine is moved. Hydraulic pressure from the draft device, indicated, causes the piston ends of cylinders 40 and 41 to thrust from the cylinders and cause beams 53 and 55 to lower beams 89 and 90 and wheels 38 and 39. When wheels 38 and 39 reach the ground surface and can be lowered no farther, beam 34 will be forced, by cylinders 40 and 41 to move upward. The upward movement of beam 34 which is joined to beam 33 by angles 35 and pin 50 will cause beam 33 to move upward.

Similar connections between beams 33 and 32 and between beams 32 and 31 will cause beams 32 and 31 to also move upwardly when beam 34 is forced to move upwardly. The upward movement of beams 31, 32, 33 and 34 causes the plows B, C and D to be disengaged from the soil and to be in the proper position to be transported to the area in which the V ditch is to be formed. When the V ditching machine is properly located for forming a V ditch, the reverse of the above action takes place. The force of the hydraulic pressure is reversed. The piston ends of cylinders 40 and 41 retract. Wheels 38 and 39 and beams 89 and 90 move upwardly when beams 53 and 55 pivot on pin 61 (FIG. 5). This action lowers plows B, C and D to the surface of the ground and is in a position to start forming the V ditch. The draft device (not drawn, but indicated) moves the V ditching machine forward in a relatively straight line over the area in which the V ditch is to be formed. This forward movement causes the concave surfaces of discs 21 through 28 (FIG. 2) to penetrate the soil. Weights 71 on beams 70 assist discs 21 through 28 to penetrate the soil and to reach the predetermined depth. Under desirable soil conditions plow B could be detached and plow C could be used as the leading plow. Also under desirable conditions plows A, B, C, D and E as illustrated in FIG. 2 may be used.

ACTION AND SEQUENCE

Plow A

This leading plow (FIG. 2) cuts a furrow by the use of disc 21 plowing and throwing soil to the left, and disc 22 plowing and throwing soil to the right. Weights 71 are used to help control the depth of cut on all plows.

Plow B

Discs 21 and 22 of this plow cut a similar furrow as mentioned above, deeper with the same action as plow A. Discs 23 and 24 cut into the original grade beyond the width of preceding plow A, plus moving the soil moved by plow A farther to the left and to the right of the V ditching machine.

Plow C

If there is a need to make a V-ditch of greater depth and width, plow C will repeat the action of plow B plus it will widen the ditch further with discs 25 and 26.

Plow D

Plow D will repeat the action of plow C, plus plow D will make the ditch wider by the use of discs 27 and 28.

Plow E

Plow E will repeat the action of plow D, plus plow E will make the ditch wider and deeper with the use of discs 29 and 30.

By adjusting weights on the rear plows, the outside discs (FIG. 2) can be allowed to ride higher than the original grade and cause redistribution of the accumulated plowed soil from the preceding plows as a smooth bedding. The contour of discharged material can be altered by changing the diameter of appropriate discs.

This V ditching machine is not limited as to how far the soil may be moved laterally nor as to how deep the ditch may be formed in one pass. By adding or deleting subassemblies of plows such as A, B, C, D and E, the depth and width of the V ditch is limited only by the practical discretion of the user.

SUMMARY RAMIFICATIONS, AND SCOPE

Accordingly, the reader will know that the V ditching machine disclosed in this specification can make V ditches as needed for the irrigation of orange groves or other areas needing to be irrigated; that the V ditch can be made as deep and as wide as desired by the user; that the V ditch can be made with one pass, over the area where the V ditch is to be made; that the V ditching machine can be assembled with various subassemblies to produce the desired depth and width of the V ditch; that the V ditch can be made by moving soil or other things in the area, to the right and to the left of the center of the V ditch; that the V ditching machine can be used for maintaining and cleaning V ditches; that the V ditching machine can be assembled using standard components, such as discs, bearings, cotter pins, hydraulic cylinders and pistons, and axles; that the use of the V ditching machine is very economical, compared to the combined use of several soil moving machines such as bulldozers, front end loaders, scrapers and trucks.

Although the description above contains many specificities, these should not be construed as limiting the scope of the invention but as merely providing illustrations of some of the presently preferred embodiments of this invention. For example the materials from which the components are made are not limited to any specifications. The components may be made from any materials that satisfactorily provide the needed requirements of material from which the components may be made. The method of moving this V ditching machine from place to place may be by any means that satisfactorily moves the V ditching machine without damage to the machine nor to any other objects encountered during the move and within a satisfactory amount of time. The raising and lowering of the carriage is not limited to the use of hydraulic cylinders and pistons. This may be accomplished by any means that provides for safe and efficient transportation and permits at the proper time and place the safe and efficient use of the plows.

Thus the scope of this V ditching machine should be determined by the appended claims and their legal equivalents, rather than by the examples given.

| Reference numerals in Drawings | | | |
|---|---|---|---|
| 21–30 | discs (concavo-convex) | | |
| 31, 32, 33, 34 | beam components of the central frame | | |
| 35 | slotted angles (welded to central frame) | | |
| 36 | brackets | | |
| 37 | swivels | | |
| 38, 39 | carriage wheels | | |
| 40, 41 | hydraulic cylinders and pistons | | |
| 42, 43, 44, 45, 46, 47 | subassemblies subassemblies | | |
| A, B, C, D, E | plows | 80 | plate |
| 50, 60, 66, 76, 91 | holes | 82 | bearings |
| 94 | holes | 73 | collars |
| 51 | towing hitch | 84 | spacers |
| 52, 61, 68, | pins | 86 | axles |
| 53, 55, 57, 70, | beams | 88 | studs |
| 54 | cotter pins | 89, 90 | box beams |
| 56 | shaped plate | 92 | stud bolts |
| 58 | flat plate | 93 | lock nuts |
| 59 | bolts | 75 | nuts |
| 63 | connectors | 77 | stud |
| 65, 95 | chains | | |
| 67, 69, 81 | slots | | |
| 71 | weights | | |
| 72, 74 | extensions | | |
| 78 | pylons | | |
| 79 | slotted angles | | |

I claim:

1. A machine for forming V ditches, the machine comprising:
   (a) a carriage for transporting the machine to and from a land area over which the machine may pass and upon which the V ditches may be formed,
   (b) a central frame comprising a plurality of individual members, the frame further comprising interlocking means for locking the individual members together to form the frame, the central frame being pivotally attached to the carriage,
   (c) means for raising and for lowering the carriage and the central frame, said means pivotally fastened to the central frame and to the carriage; the central frame being lowered as the carriage is raised and raised as the carriage is lowered,
   (d) forming means attached to the central frame for forming a V ditch, said forming means including a first forwardmost plow means for forming a V ditch of predetermined depth and width and a plurality of aligned succeeding tandem plow means for increasing by a predetermined amount the depth and width of the V ditch formed by a preceding plow means, wherein each plow means includes a pair of plows, one extending forwardly and outwardly from one side of the central frame and the other extending forwardly and outwardly from the other side of the central frame; and
   (e) a universal means for attaching each of said plows to the central frame.

2. The machine of claim 1 in which the carriage comprises a plurality of wheels, and an enveloping box beam axle, the wheels being mounted on the axle, the axle being pivotally attached to the means for raising and lowering the carriage, the means for raising and lowering the carriage being pivotally attached to the central frame.

3. The machine of claim 2 in which each of the plows includes a beam with at least two concavo-convex discs mounted thereon for moving soil outwardly from the central frame.

4. The machine of claim 3 further comprising a plurality of chains of a predetermined size for maintaining a predetermined angle between the plows and the central frame, one end of each of the chains being connected by fasteners to the central frame, the other end of each of the chains being connected by fasteners to one of the plows, each of the plows being attached to the central frame by the chains.

5. The machine of claim 4 further comprising a plurality of weights of a predetermined amount for assisting in the forming of the V ditches, the weights being attached to the plows by fasteners.

6. The machine of claim 5 wherein each universal means includes: a horizontal bracket welded in transverse position to the bottom of an individual member of the central frame; a U-shaped swivel having a horizontal portion and two vertical side portions, said swivel being horizontally pivotally connected to the bracket by a stud bolt which extends through the horizontal portion of said swivel and said bracket; a nut screwed onto the end of the stud bolt holding the swivel in a pivotal condition; said swivel further having a pivot pin extending horizontally through holes in the vertical side portions of the swivel and through matching holes in an end of each plow means.

* * * * *